United States Patent [19]
Okayama

[11] Patent Number: 6,057,673
[45] Date of Patent: May 2, 2000

[54] COMPENSATION DEVICE AND POWER TRANSMISSION SYSTEM USING A COMPENSATION DEVICE

[75] Inventor: Hideo Okayama, Tokyo, Japan

[73] Assignee: Mitsubishi Denki Kabushiki Kaisha, Tokyo, Japan

[21] Appl. No.: 09/207,154

[22] Filed: Dec. 8, 1998

[30] Foreign Application Priority Data

Aug. 26, 1998 [EP] European Pat. Off. .............. 98116096

[51] Int. Cl.$^7$ ..................................................... G05F 1/70
[52] U.S. Cl. ........................................... 323/207; 323/210
[58] Field of Search ................................... 323/205, 207, 323/208, 209, 210, 211

[56] References Cited

U.S. PATENT DOCUMENTS

| | | | |
|---|---|---|---|
| 4,434,376 | 2/1984 | Hingorani | 323/210 |
| 4,999,565 | 3/1991 | Nilsson | 323/209 |
| 5,032,738 | 7/1991 | Vithayathil | 323/211 |
| 5,227,713 | 7/1993 | Bowler et al. | 323/210 |
| 5,367,197 | 11/1994 | Klerfors | 323/211 |
| 5,384,528 | 1/1995 | Leowald et al. | 323/209 |
| 5,621,305 | 4/1997 | Clark et al. | 323/210 |
| 5,652,504 | 7/1997 | Bangerter | 323/211 |
| 5,805,437 | 9/1998 | Gruning | 363/71 |
| 5,942,880 | 8/1999 | Akamatsu et al. | 323/207 |

FOREIGN PATENT DOCUMENTS

| | | | |
|---|---|---|---|
| 0802617 | 11/1997 | European Pat. Off. | H02M 5/45 |
| 2294821 | 5/1996 | United Kingdom | H02J 3/18 |

OTHER PUBLICATIONS

Stemmler et al.; "Transformerless Reactive Series Compensators With Voltage Source Inverters"; Proceedings of the PCC, Nagaoka, May 1997, pp. 197–202.

Ortmeyer et al., "Continuously Regulated Series Capacitor", IEEE Transactions on Power Delivery, vol. 8, No. 3, Jul. 1993, pp. 1348–1355.

Primary Examiner—Jeffrey Sterrett
Attorney, Agent, or Firm—Leydig, Voit & Mayer, Ltd.

[57] ABSTRACT

A compensation device connected in series with power transmission lines having at least one circuit breaker and including at least one compensator unit with a transformerless reactive series compensator having a DC capacitor and a single-phase inverter. A pre-charger pre-charges the DC capacitor of at least one compensator unit. The pre-charger may decouple the DC capacitor from the power transmission lines during pre-charging. The pre-charger may include an AC switch and an AC switch controller opening the AC switch for a time interval (alfa) after a zero-crossing of the line current.

20 Claims, 10 Drawing Sheets

POWER FLOW
FOR PRE-CHARGING

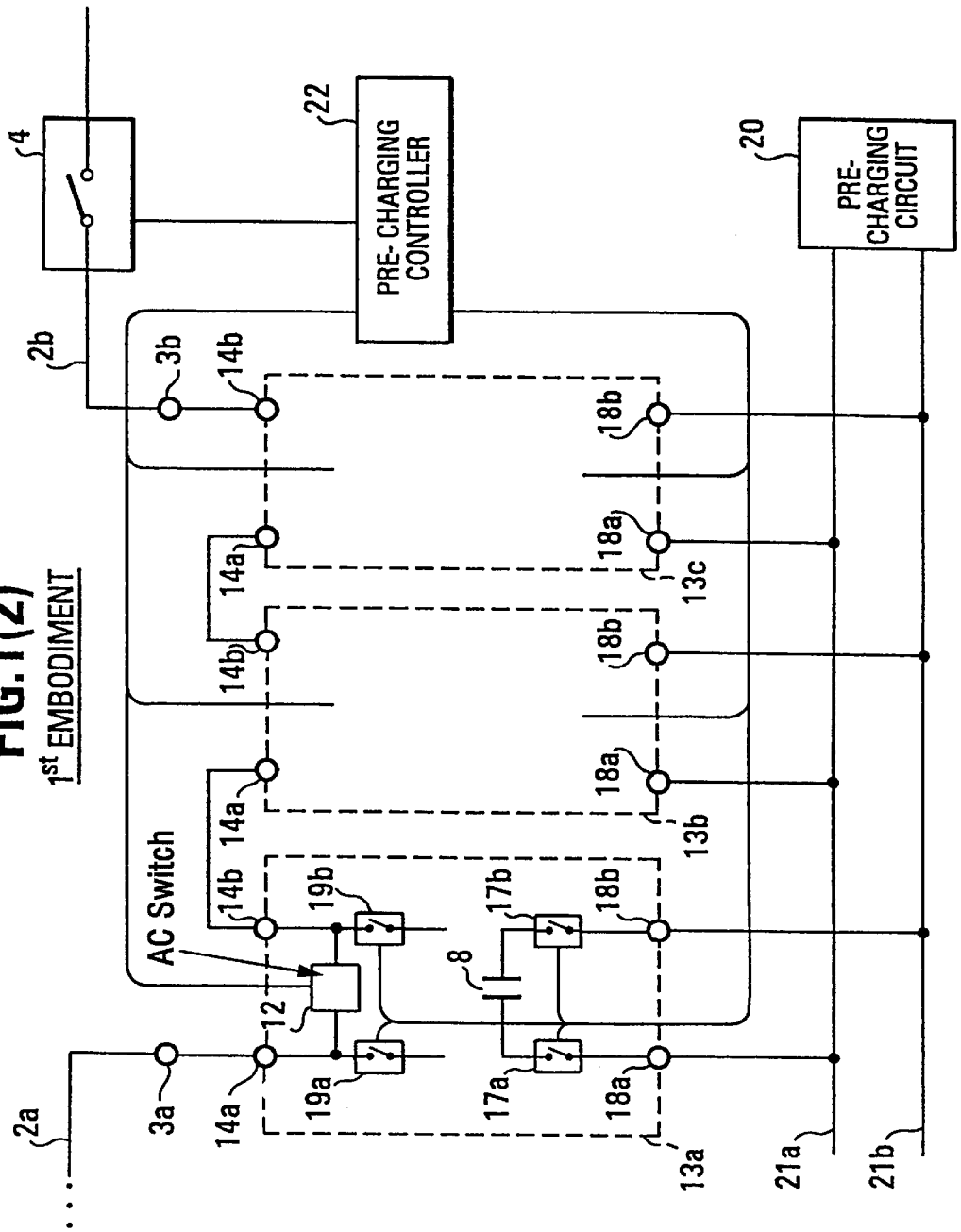

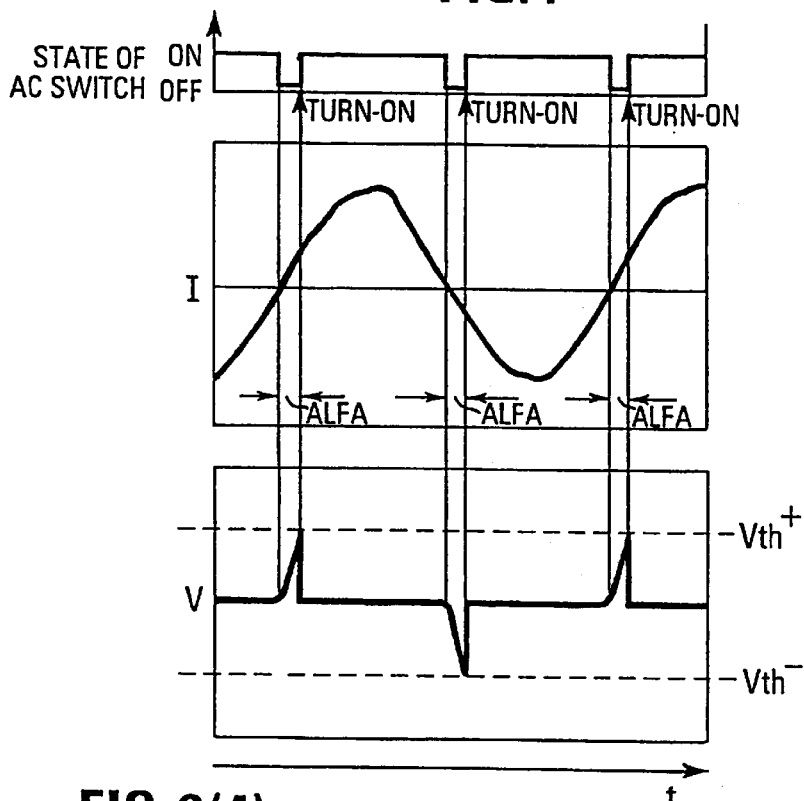
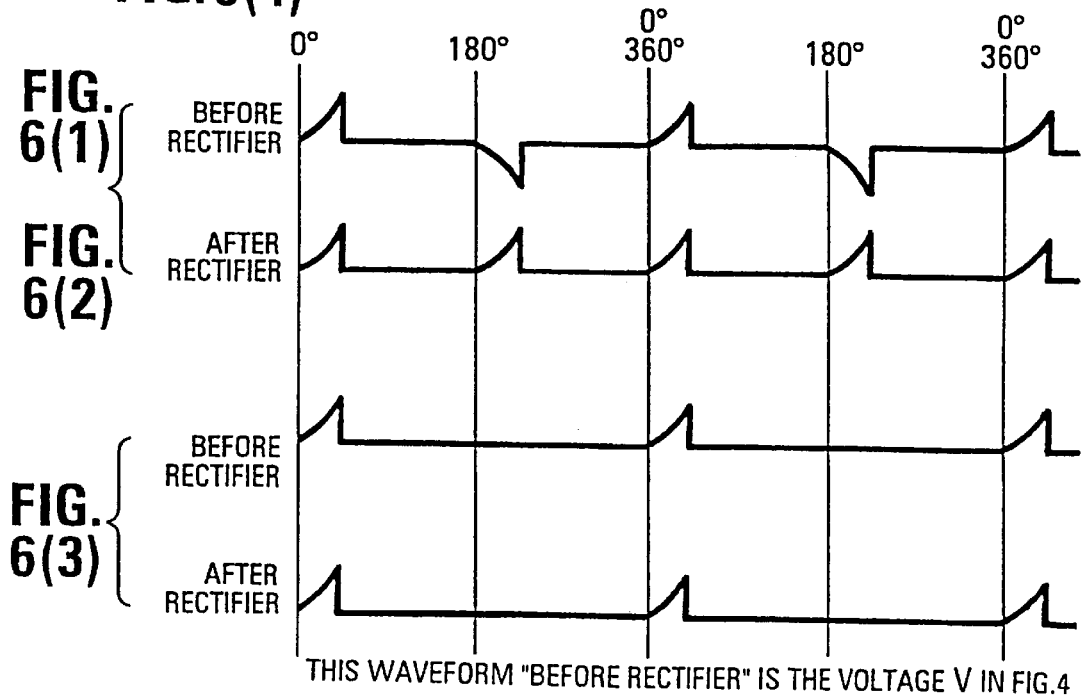
THIS WAVEFORM "BEFORE RECTIFIER" IS THE VOLTAGE V IN FIG.4

COMPENSATION DEVICE AND POWER TRANSMISSION SYSTEM USING A COMPENSATION DEVICE

BACKGROUND OF THE INVENTION

1. Field of the Invention

The invention relates to a compensation device and a power transmission system using such a compensation device. In particular, the invention relates to such a compensation device which comprises a transformerless reactive series compensator.

2. Description of the Related Art

Compensation devices are typically used in power transmission systems in order to increase power transmission capacity and to make the power more stable. Normally, such a compensation device is connected in series with power transmission lines including a circuit breaker and includes at least one compensator unit. Each compensator unit includes a transformerless reactive series compensator which comprises a DC capacitor and a single-phase inverter constituted by self arc-suppressing semiconductors.

More specifically, in the compensation unit the respective inverter is connected to a respective DC capacitor. In such a compensation device, before a normal operation can start, the DC capacitor must be pre-charged to a specified voltage which is conventionally performed by an additional pre-charging circuit or by a line current which flows through a transmission line.

The invention in particular relates to the problem of how the compensation devices can efficiently pre-charge the at least one DC capacitor with a pre-charging circuit of a simple hardware configuration.

Several different examples of compensation devices have been used in power transmission systems in recent years to provide more stable and higher efficiency power transmission systems. Such power transmission systems are called flexible AC transmission systems (so-called FACTS). In the compensation devices, semiconductor devices have been conventionally applied. Such semiconductor devices can comprise self arc-suppressing semiconductors like gate-turn-off thyristors (so-called GTOs) and gate-commutated turn-off thyristors (so-called GCTs). In addition, insulated gate bipolar transistors (so-called IGBTs) may be employed. Such components have been applied to power converters, e.g., the inverters of the compensation devices, and it is invisaged that their application will be more widespread in the future in order to realize more stable power transmission systems.

There is one compensation device which comprises a transformerless reactive series compensator (so-called TLRSC) to be used in the FACTS systems.

FIG. 9 shows a power transmission system, comprising two AC power systems 1a, 1b coupled to each other through power transmission lines 2a, 2b, a compensation device 3, namely a TL-RSC 3, and a circuit breaker 4 provided between the AC power system 1b and the power transmission line 2b. The TLRSC 3 is provided between the power transmission lines 2a and 2b not only to increase the power transmission capacity but also to make it more stable. In addition, the TL-RSC 3 is directly connected in series with the transmission lines 2a, 2b at two output terminals 3a, 3b without any transformer.

FIG. 10 shows a detailed configuration of the TL-RSC 3 as known from the following two prior art references, "Transformerless Reactive Series Compensators with Voltage Source Inverters", Proceedings of the Power Conversion Conference (PCC)—Nagaoka 1997, pp. 197–202 and EP 98 106 780.4.

In FIG. 10, self arc-suppressing semiconductors are designated by 5a to Ed, free-wheeling diodes connected in anti-parallel with each of the self arc-suppressing semiconductor 5a to Ed are designated by 6a to 6d, a single-phase inverter which consists of the self arc-suppressing semiconductors 5a to Ed and the free-wheeling diodes 6a to Ed, is designated by 7, a DC capacitor connected to the single-phase inverter 7 is designated by 8, filter reactors are designated by 9a and 9b, a filter capacitor is designated by 10, a filter circuit which consists of the filter reactors 9a, 9b and the filter capacitor 10 is designated by 11 and an AC switch is designated by 12. Furthermore, a compensator unit of the compensator device TL-RSC 3 is designated by 13 and two output terminals of the compensator unit 13 are designated by 14a and 14b.

In FIG. 10, the self arc-suppressing semiconductor 5a is shown as being separate from the free-wheeling diode 6a. However, in recent years, reverse-conducting self arc-suppressing semiconductors which integrate both functions of the self arc-suppressing semiconductor 5a and the free-wheeling diodes 6a in the same package have been developed. When the reverse-conducting self arc-suppressing semiconductors are applied to the single-phase inverter 7, the free-wheeling diodes 6a to Ed are not necessary in FIG. 10.

Whilst in FIG. 10, the compensator device TL-RSC 3 consists of one compensator unit 13, FIG. 11 shows a compensator device consisting of several compensator units denoted 13a, 13b, 13c. Such a configuration can have a much more powerful compensatable capacity. Here, the compensator device TL-RSC 3 consists of several cascaded compensator units 13a to 13c connected in series at their output terminals 14a and 14b of each compensator unit 13a, 1ab, 13c. Of course, each of the compensator units 13a to 13c has the same configuration as shown in FIG. 10. Conventionally, typically up to 10 such compensator units may be connected in series.

As shown in FIG. 10, the single-phase inverter 7 is connected in series and indirectly with the power transmission lines 2a, 2b without any transformer. That is, the inverter 7 is coupled to the power transmission lines 2a, 2b via the filter circuit 11 inserted in series to the transmission lines 2a, 2b. The filter circuit 11 essentially suppresses harmonic distortions which result from the single-phase inverter 7 being operated by a pulse width modulation (so-called PWM) control (as is well known, the PMW control is applied for switching the inverter 7 on/off over predetermined time-intervals). When the influence from the single-phase inverter 7 on the transmission lines 2a, 2b (i.e. regarding the impedance matching and/or the spikes caused on the transmission lines by the PWM control) is very small, especially in the case of high PWM frequencies, the filter circuit 11 may be eliminated. Thus, a separated configuration of the filter reactors 9a, 9b is not essential and only one of them may be sufficient.

The AC switch 12 is defined as a switch which opens and closes for connecting or disconnecting the terminals 14a, 14b, at predetermined turn-on/turn-off timings and which can also pass an AC current when closed (i.e. in an on-state). EP 98 106 780.4 discloses the control of such an AC switch 12 for start-up and shut-down operations of a compensator device TL-RSC 3.

Although the use of a compensator device with a TL-RSC 3 has been generally proposed for new FACTS systems, no actual operable circuit has been presented up to now due to some intrinsic problems. During its normal PWM operation the TL-RSC 3 controls the line current flowing through the transmission lines 2a, 2b and the single-phase inverter 7 generates an output voltage by using a voltage of the DC capacitor 8.

However, before the start of a normal PWM operation the voltage of the DC capacitor 8 is zero and therefore a pre-charging operation of the DC capacitor 8 is necessary. Thus, the realization of a workable TL-RSC 3 depends heavily on the provision of effective pre-charging techniques, in particular with respect to the cost, size and weight of the individual components used for the pre-charging, as will be explained hereinafter.

Firstly, a half-bridge circuit of an inverter for three phases including a pre-charging circuit for the DC capacitor 8 is shown in FIG. 12. As is seen in FIG. 12, the circuit configuration is a parallel one, i.e. the pre-charging of the DC capacitor 8 is performed by diverting a part of the current flowing through each phase (3 phase line) of the power transmission lines 2 to the respective half-bridge circuit and thus to the DC capacitor. The pre-charging circuit makes it possible to charge the DC capacitor 8 with current from the transmission line 2.

A pre-charging circuit as in FIG. 12 is illustrated in "Mitsubishi Denki Gihou, Vol. 63, No. 10, 1989, pp. 41". Here, the inverter has been applied to an active filter in order to decrease the harmonic distortion in the transmission line 2. As is Seen in FIG. 12, as the pre-charging circuit a switch 15a is connected in series to a respective pre-charging resistor 16 and another switch 15b is connected in parallel across the switch 15a and the pre-charging resistor 16.

During the pre-charging operation, i.e. before the normal PWM operation of the active filter can begin, the switch 15a is on and the switch 15b is off. Thus, it is possible to get power (basically current) through the pre-charging resistor 16 from the transmission line 2 and to pre-charge tee DC capacitor 8. The pre-charging resistor 16 works as a current limiting resistor.

After the pre-charging operation period, the pre-charging resistor 16 is shorted by the switch 15b turning on and, at the same time, the switch 15a should be opened.

When such a parallel-type pre-charging circuit as used in FIG. 12 for an active filter is applied to a compensator device TL-RSC 3, which especially has such a multiple configuration as illustrated in FIG. 11, many pre-charging resistors 16 (3 for each compensator unit) and many auxiliary switches 15a, 15b (2 for each compensator unit) are necessary. In addition, during the normal operation of the TL-RSC 3, the line current flows through the switch 15b. When applying the parallel-type pre-charging circuit of FIG. 12 to an active filter, then a conducting current which flows through the switch 15b is a current to compensate the distorted current in the power transmission systems (not shown in FIG. 12). Therefore, the conducting current of the switch 15b is in, the case of the Active Filter comparatively small.

However, when applying the pre-charging circuit of the parallel-type to a compensator device TL-RSC 3 including a transformerless reactive series compensator, on the other hand, the on-state power loss caused by the switch 15b is extremely high due to the high currents and voltage occurring in a power transmission system.

Secondly, in a compensator unit 13, a filter circuit 11 is employed which in particular comprises a filter capacitor 10. The capacitance of the filter capacitor 10 is designed to decrease harmonic distortion caused from the single-phase inverter 7 driven by the PWM control. On the other hand, the filter capacitor 10 is connected in series to the transmission lines 2a, 2b during the above-mentioned pre-charging operation (during the pre-charging the AC switch 12 is open) and the capacitance of the filter capacitor 10 is not matched in any way to the series connection with the transmission line 2a, 2b. Therefore, the series-type compensator device 3 in FIG. 10 has another disadvantage, namely that the capacitance of the filter capacitor 10 has no impedance-matching to the transmission lines. Therefore, if such a parallel-type pre-charging circuit as in FIG. 12 is applied to the series-type compensator device TL-RSC 3 as in FIG. 10, the filter capacitor 10 may be overcharged during the pre-charging because of the unmatched capacitance of the filter capacitor 10 of the filter circuit 11.

As mentioned above, there are some aspects to consider when the conventional pre-charging technique is applied to the TL-RSC 3. Namely, a lot of pre-charging resistors 16 are necessary for each compensator unit 13. Additionally, many switches 15a, 15b to connect or to disconnect the respective pre-charging resistors 16 are also necessary. In addition, comparatively large capacity cooling systems are necessary for the switches 15b to pass the line current due to the high currents and voltages occurring in a power transmission system. Furthermore, in order to solve the overvoltage problem of tie filter capacitor 10, the capacitance of the filter capacitor 10 must be increased or the filter capacitor 10 must be Equipped with a voltage limiting device. These prerequisites require large-size and expensive components. Therefore, they make the TL-RSC 3 itself larger and more expensive, i.e. the parallel-type pre-charging circuit using the line current for the pre-charging of the DC capacitor cannot be applied to the series-type compensator device.

SUMMARY OF THE INVENTION

Consequently, the object of the present invention is to provide a series-type (i.e. arranged serially in the power transmission lines) compensation device and a power transmission system using such a compensation device having a simple circuit configuration while still allowing efficient pre-charge the DC capacitor without the above mentioned disadvantages in connection with the parallel-type pre-charging circuit.

This object is solved by a compensation device connected in series with power transmission lines having at least one circuit breaker and including at least one compensator unit with a transformerless reactive series compensator having a DC capacitor and a single-phase inverter wherein a pre-charging means is provided for precharging the DC capacitor of tie at least one compensator unit.

The object is also solved by a power transmission system comprising two AC power systems coupled to each other through power transmission lines, at least one circuit breaker inserted in the power transmission lines and one or more compensation devices inserted into the power transmission lines, wherein each of the compensation devices includes at least one compensator unit with a transformerless reactive series compensator having a DC capacitor and a single-phase inverter wherein a pre-charging means is provided for pre-charging the DC capacitor of the at least one compensator unit.

Such a compensation device and power transmission system only use a minimum number of circuit components in the respective compensator unit in order to realize the pre-charging operation therein and no large size components are required, which makes the compensation device and the system small in size and cost-effective.

According to one preferred embodiment the pre-charging means comprises one pre-charging circuit formed by a converter providing a DC charging voltage to charge the DC capacitor, first switches to separate/connect the pre-charging circuit from/to said DC capacitor, second switches to separate/connect said single-phase inverter from/to the power transmission lines and a pre-charging controller for controlling the switches such that during a pre-charging operation the pre-charging circuit is connected to the DC capacitor while the DC capacitor is separated from output terminals of the compensator unit, whereas after the end of the pre-charging operation the switches are controlled such that the DC capacitor is separated from the pre-charging circuit but connected to the output terminals of the compensator unit.

According to another preferred embodiment several compensator units each including a DC capacitor are provided, wherein respective switches are provided for performing the connecting/separating control separately for each DC capacitor, wherein the pre-charging circuit simultaneously pre-charges all DC capacitors connected in parallel.

According to another preferred embodiment the pre-charging circuit comprises a converter.

According to another preferred embodiment the pre-charging means comprises an AC switch having a first and a second terminal coupled to output terminals of the at least one compensator unit and an AC switch controller which turns off the AC switch for a time interval after a zero-crossing of the line current flowing through the power transmission lines.

According to another preferred embodiment the AC switch includes at least 2 thyristors connected in anti-parallel.

According to another preferred embodiment the AC switch includes 4 thyristors and one current limiting device, wherein the cathodes of a first and second thyristor are connected together at a first series connection node, the anodes of a third and fourth thyristor are connected together at a second series connection node, the anode of the first thyristor and the cathode of the third thyristor are connected to the first terminal of the AC switch, the anode of the second thyristor and the cathode of the fourth thyristor are connected to the second terminal of the AC switch and the current limiting device is connected between the first and second series connection nodes.

According to another preferred embodiment the AC switch includes 5 thyristors and one current limiting device, wherein the cathode of a third thyristor is connected to the anode of a fourth thyristor, the cathode of a second thyristor is connected to the anode of a first thyristor, the cathode of a first thyristor and the anode of the third thyristor are connected to the first terminal of the AC switch, the anode of a second thyristor and the cathode of the fourth thyristor are connected to the second terminal of the AC switch, a fifth thyristor is connected in anti-parallel to the first thyristor and the one current limiting device is connected between the anode of the first thyristor and the cathode of the third thyristor.

According to another preferred embodiment the AC switch includes 6 thyristors, wherein a sixth thyristor is connected in anti-parallel to the fourth thyristor.

According to another preferred embodiment each of the self arc-suppressing semiconductors has a gate power supply means to supply a gate power from the DC capacitor directly or indirectly to a gate drive unit of each self arc-suppressing semiconductor.

Further advantageous embodiments and improvements of the invention are listed in the dependent claims. Hereinafter, the invention will be described with reference to its embodiments and with reference to the attached drawings.

BRIEF DESCRIPTION OF THE DRAWINGS

FIG. 1(2) shows a compensation device according to a first embodiment of the invention applied to an example where the compensation device comprises three compensator units 13a, 13b, 13c;

FIG. 4 shows the control method of the AC switch according to the invention;

FIG. 6(2) shows another embodiment of an AC switch that consists of six thyristors and a current limiting device according to the invention;

FIG. 6(3) shows another embodiment of an AC switch that consists of five thyristors and a current limiting device 31 according to the invention;

FIG. 6(4) shows waveforms before and after the rectifier (part of the inverter 7) for the AC switch embodiments in FIG. 6(1), 6(2), 6(3);

FIG. 7(2) shows an example of a conventional gate drive power supply circuit including an insulating transformer;

FIG. 7(3) shows an example of a gate drive unit 39 illustrated in FIG. 7(1);

DESCRIPTION OF THE PREFERRED EMBODIMENTS

Principle of the Invention

Figure 1:
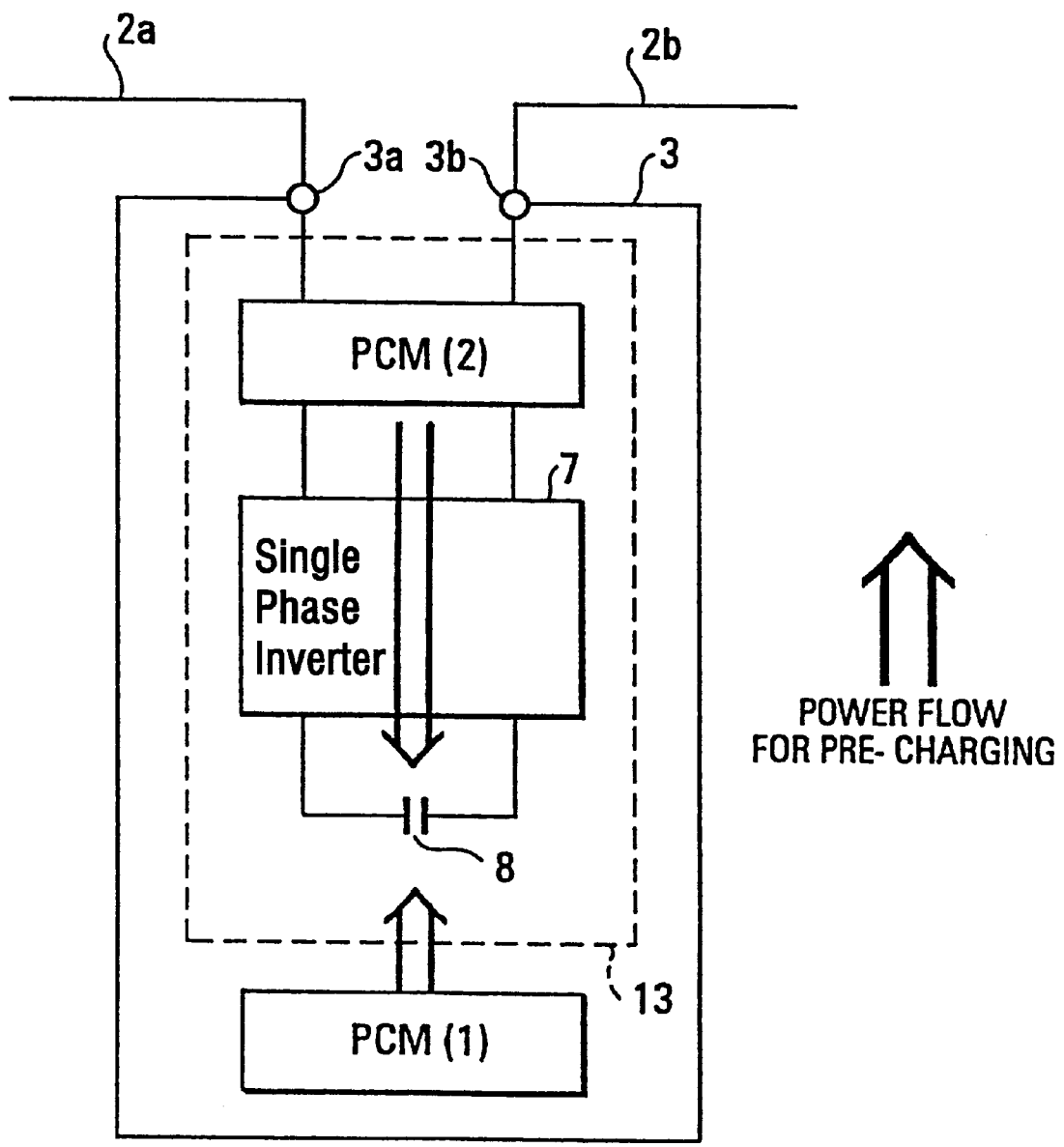
FIG. 1(1) shows a block diagram of a compensation device according to the invention having a pre-charging means PCM.
Figure 9:
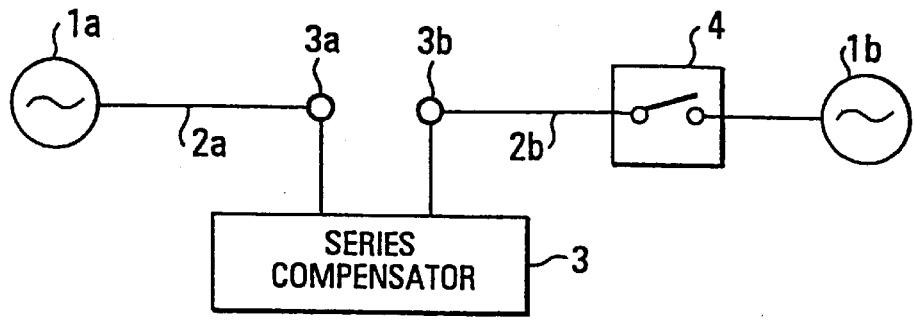
FIG. 9 shows an application of a compensation device according to the prior art.
Figure 10:
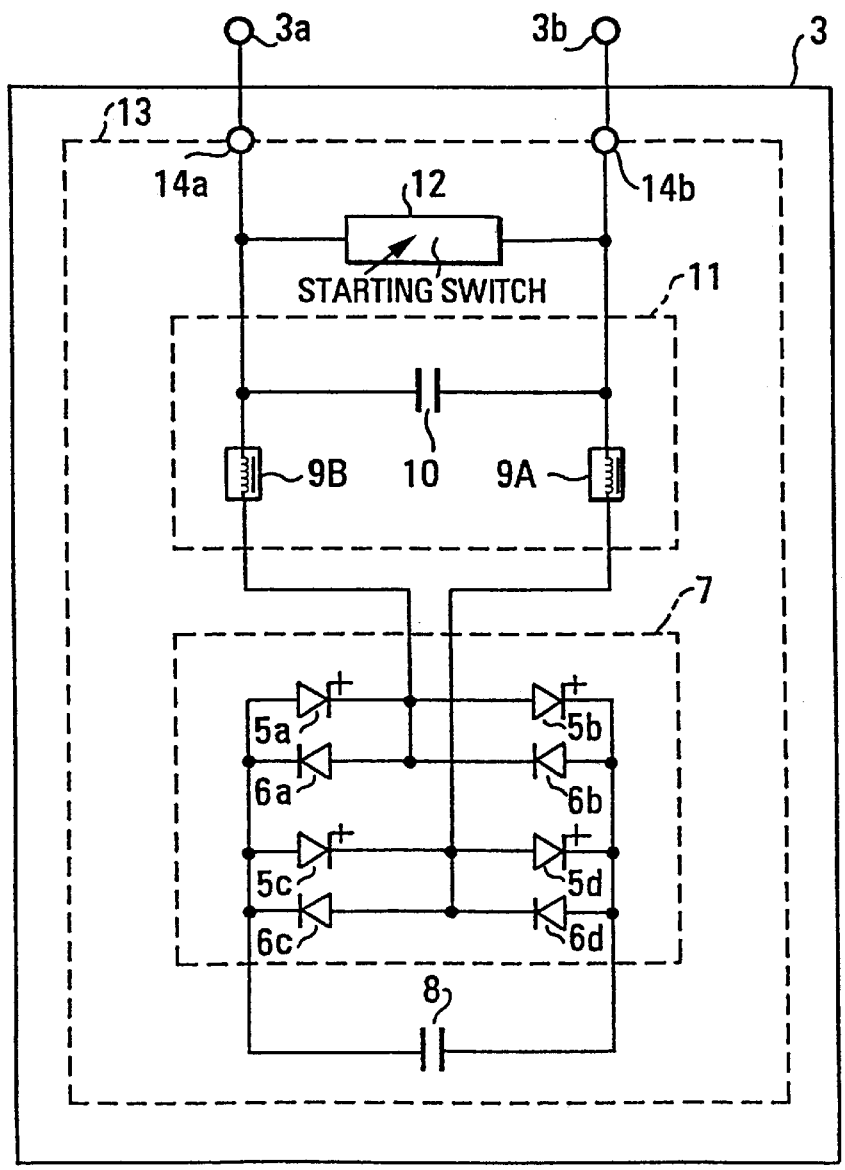
FIG. 10 shows a configuration of a transformerless reactive series compensator according to the prior art.

FIG. 1(1) shows a compensator device 3 according to the invention which is connected in series with power transmission lines 2a, 2b having at least one circuit breaker (see e.g. reference numeral 4 in FIG. 9) and including one compensator unit 13 including a transformerless reactive series compensator (hereinafter called a TL-RSC) having a DC capacitor 8 and a single-phase inverter 7 preferably formed by self-arc-suppressing semiconductors 5a, 5b, 5c and 5d (as shown in FIG. 10).

Figure 11:
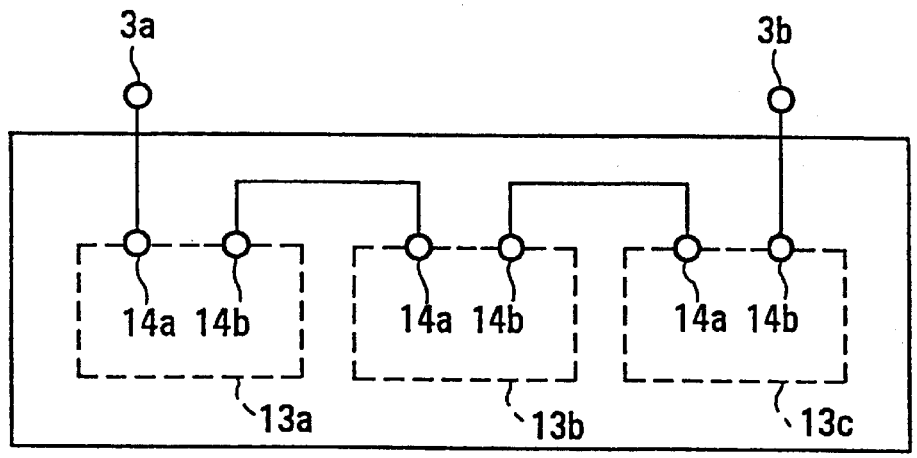
FIG. 11 shows a multiple configuration of the compensation device according to the prior art.

It should be noted that other configurations for the inverter may be used as well, such that the invention is not restricted to the usage of only the self-arc-suppressing semiconductors. Furthermore, the invention is not restricted to the compensator device having only one compensator unit but the principle of the invention may be applied to a compensator device having cascaded compensator units as shown in FIG. 11 and FIG. 1(2) (to be explained below).

FIG. 1(1) shows a compensator device with a pre-charging means. As is illustrated in FIG. 1(1) the pre-charging means may be provided either essentially separate from the single (or a plurality of) compensator unit(s) 13, as indicated with the arrangement of PCM(1). The pre-charging means PCM(1) relates to the first embodiment as explained below.

Alternatively, the pre-charging means may be provided essentially between the power transmission lines 2a, 2b and the inverter 7, as is indicated with the arrangement of PCM(2). The pre-charging means PCM(2) uses power from the transmission lines 2a, 2b for charging the DC capacitor 8 and relates to the second embodiment as also explained below with more details.

According to another embodiment, the pre-charging means PCM(1) and PCM(2) may also be used in combination.

If there are several cascaded compensator units as in FIG. 11 the pre-charging means PCM(1) may be used for pre-charging each individual DC capacitor 8 in each unit, i.e. PCM(1) can be provided commonly for all compensator units. On the other hand, in case of cascaded compensator units the pre-charging means PCM(2) is provided separately in each compensator unit.

Due to the separate provision of an independent pre-charging means; PCM(1), pre-charging may here be carried out without the usage of a pre-charging resistor 16 as in FIG. 12. The pre-charging means PCM(1) can preferably be a converter outputting a DC voltage for charging the DC capacitor. Thus, the number of components may be reduced and the power loss caused by the conventional resistor 16 may be avoided.

Figure 12:
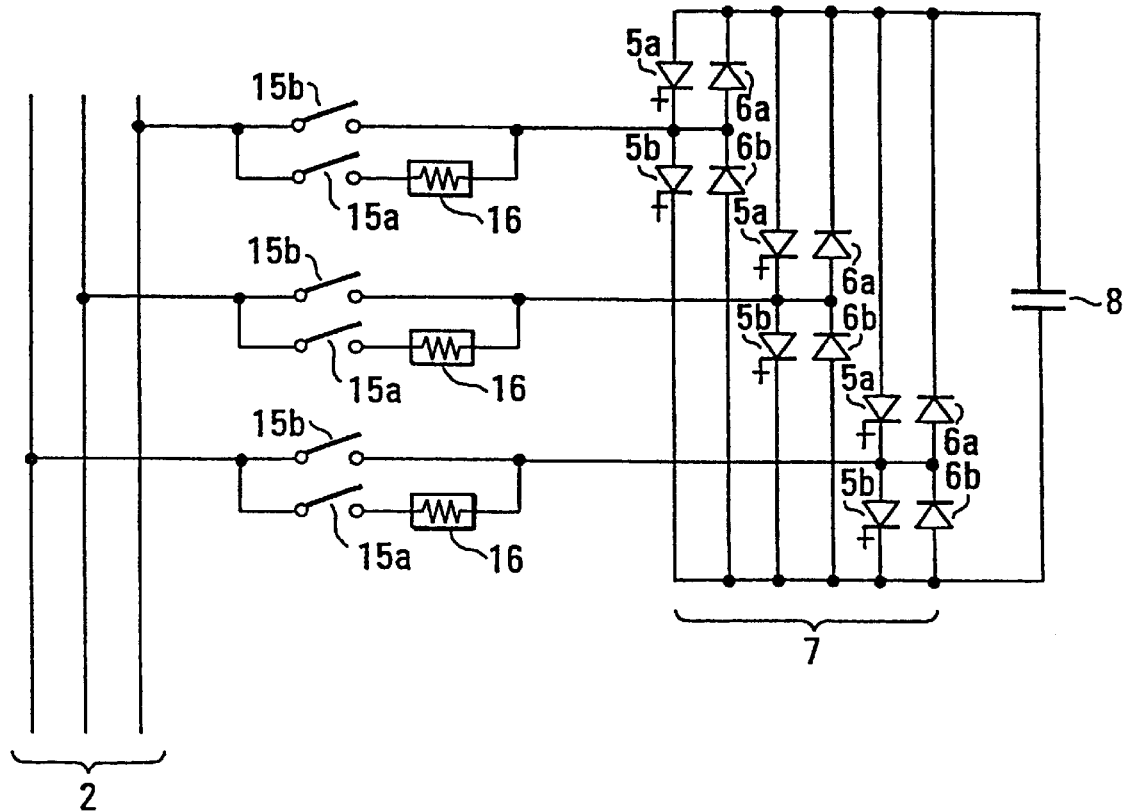
FIG. 12 shows a pre-charging circuit according to the prior art.

Due to the provision of a pre-charging means PCM(2), pre-charging is carried out also without the provision of a charging resistor 16 as in FIG. 12. As will be seen below, the pre-charging means PCM(2) uses the line current and a special control of an AC switch for pre-charging the DC capacitor.

The common idea behind the provision of PCM(1) and PCM(2) is of course the avoidance of the charging resistor as in the prior art, i.e. to provide a separate pre-charging means which does not cause a power loss or an impedance mismatch. PCM(1), PCM(2) both solve this problem by inserting in the compensator unit only elements for the pre-charging, which cannot consume energy, like switches or current/voltage detectors.

Embodiments of the pre-charging means PCM(1), PCM (2) will be described below with more details. Hereinafter, if the description relates to the first embodiment the reference numeral PCM indicates PCM(1) and if it relates to the second embodiment, the reference numeral PCM indicates PCM(2).

First Embodiment

FIG. 1(2) shows a compensator device 3 according to a first embodiment of the invention which is connected in series with power transmission lines 2a, 2b having at least one circuit breaker 4 and including three series connected compensator units 13a, lab, 13c each including a transformerless reactive series compensator (hereinafter called a TL-RSC) having a DC capacitor 8 and a single-phase inverter 7 preferably formed by self arc-suppressing semiconductors 5a, 5b, 5c and Ed (as shown in FIG. 11). As aforementioned, the invention is not restricted to the compensator device having three cascaded compensator units and the principle of the invention may be applied to a compensator device only having one single compensator unit as shown in FIG. 1(1). In FIG. 1(2), each compensator unit 13a, 13b, 13c comprises a principal circuit configuration as in FIG. 1(1) (or FIG. 10).

In FIG. 1(2) the pre-charging means comprises a pre-charging circuit 20, two switches 17a, 17b connected at one end thereof to a respective DC capacitor 8 and connected at a positive input terminal 18a and a negative input terminal 18b to a positive and negative output terminal 21a, 21b of the pre-charging circuit 20, another two switches 19a, 19b connected to the output terminals 14a and 14b of the compensator units 13a, lab, 13c and a pre-charging controller 22 controlling the switches 17a, 17b, 19a, 19b, the AC switch 12 and the circuit breaker 4 as will be explained below with more detail.

Viewing the circuit configuration of FIG. 1(1) and FIG. 1(2) together, it will be appreciated that the first switches 17a, 17b are arranged between the DC capacitor 8 and the pre-charging circuit output voltage provided on the terminals 21a, 21b, while the second switches 19a, 19b are arranged between the terminals 14a, 14b and the filter circuit 11 or between the filter circuit 11 and the inverter 7 or between the inverter 7 and the DC capacitor 8 to allow a decoupling of the DC capacitor 8 from the transmission lines 2a, 2b (i.e. the output terminals 14a, 14b of the respective compensator unit) during the precharging operation as will be seen below.

Figure 2:
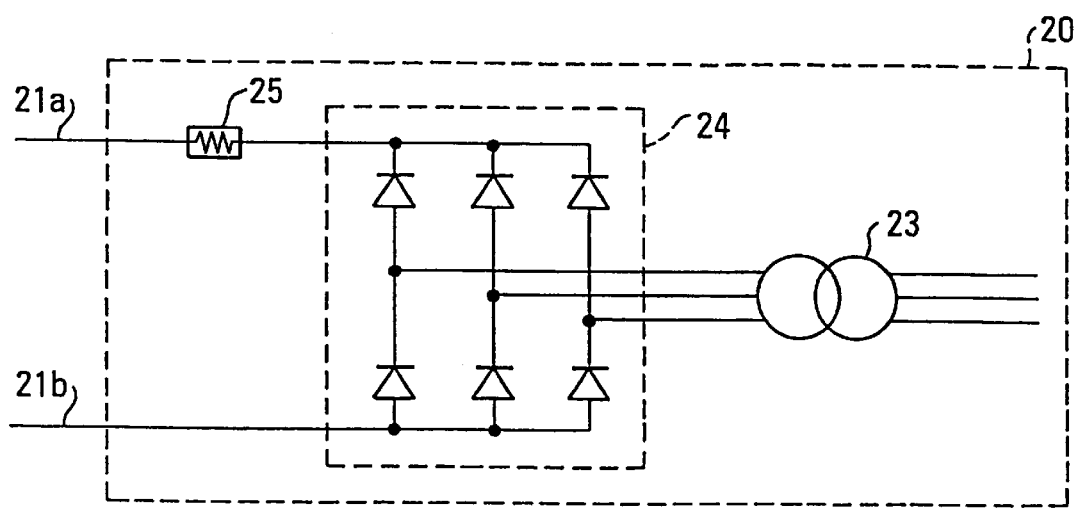
FIG. 2 shows the pre-charging circuit 20 usable e.g. the compensation device in FIG. 1(2)

One preferred embodiment of the pre-charging circuit 20 is a converter outputting a DC voltage for pre-charging the respective DC capacitor 8. FIG. 2 shows a concrete example of the pre-charging circuit 20 that is very simple. An AC voltage is supplied from a transformer 23 and a diode rectifier outputs a DC voltage to the output terminals 21a, 21b. A current limiting resistor 25 may be provided to decrease an in rush current during a pre-charging operation. The amplitude of the pre-charging voltage is decided by the transformer 23 and the time constant is decided by a resistance of the current limiting resistor 25 and a capacitance of the DC capacitor 8.

Next, a pre-charging process according to the pre-charging circuit in FIG. 1(2) is described. Before pre-charging, the switches 17a, 17b, 19a, 19b (such that the capacitor 8 is separated from the output terminals 14a, 14b of the compensator unit 13a) and the AC switch 12 are set in an off-state by the pre-charging controller 22. After the pre-charging controller 22 receives a pre-charge command from a main controller (not shown in FIG. 1(2)), the pre-charging controller 22 first closes the switches 17a, 17b. Then, the pre-charging circuit 20 charges all the DC capacitors 8 connected to the output terminals 21a, 21b. After finishing the pre-charging operation, the pre-charging controller 22 opens the switches 17a, 17b, turns on the AC switch 12 and then closes the switches 19a, 19b and after that the circuit breaker 4. The line current starts to flow through the power transmission lines 2a, 2b via the circuit breaker 4. After that, a start-up operation of each compensator unit 13a, lab, 13c (or of the single compensator 13, when the compensator device only comprises only one single compensator unit as in FIG. 1(1)), using a predetermined control of the AC switch 12 may be carried out, for example in the manner as described in EP 98 106 780.4, the disclosure of which is hereby incorporated by reference.

During the pre-charging operation, if the compensator device comprises several compensator units 13a, lab, 13c as in FIG. 1(2) (and not only one as in FIG. 1(1)), the pre-charging controller 22 can select one or several of the switches 17a, 17b while the circuit breaker 4 still prevents power (actually a current) flow to the DC capacitor 8 from the transmission lines 2a, 2b. Since during the pre-charging operation the pre-charging controller 22 opens the switches 19a, 19b and/or the circuit breaker 4, it is possible that plural DC capacitors 8 having different voltage potentials during normal operation (or a single DC capacitor 8, if the compensator device only comprises one single compensator unit as in FIG. 1(1)) may be connected in parallel to the output terminals 21a, 21b of the pre-charging circuit 20 at the same time (as principally illustrated in the overview diagram in FIG. 1(1)).

Whilst in FIG. 1(2) only one phase of the three phases (as indicated schematically in FIG. 12) of the power transmission lines are considered, according to yet another embodiment of the invention, the pre-charging circuit 20 can preferably be commonly connected in parallel to several DC capacitors 8 of the compensator units 13a, 13b, 13c provided individually for each phase and can separately pre-charge each individual DC capacitor provided therein.

The pre-charging circuit 20 in FIG. 1(2) is connected to several DC capacitors 8 which are located to the same phase. However, it is also possible that the pre-charging circuit 20 may be connected to other DC capacitors 8 which are located to other phases.

As described with reference to FIG. 1(1) and FIG. 1(2), essentially the pre-charging means PCM of the invention performs a control to decouple the respective DC capacitor 8 from the other circuit components of the compensator device and the power transmission lines and to charge it independently with a DC voltage provided separately from the power transmission lines by the pre-charging circuit 20 during the pre-charging operation.

Second Embodiment

In FIG. 1(2) the pre-charging means PCM comprises as one embodiment a separately provided pre-charging circuit 20 which is, for example, formed by a converter according to FIG. 2 including a transformer 23 and a diode rectifier 24 for providing the DC pre-charging output voltage. Hereinafter, a second embodiment of a pre-charging means PCM(2) shown in FIG. 1(1) is described which does not employ the pre-charging circuit 20 shown in FIG. 1(2).

Figure 3:
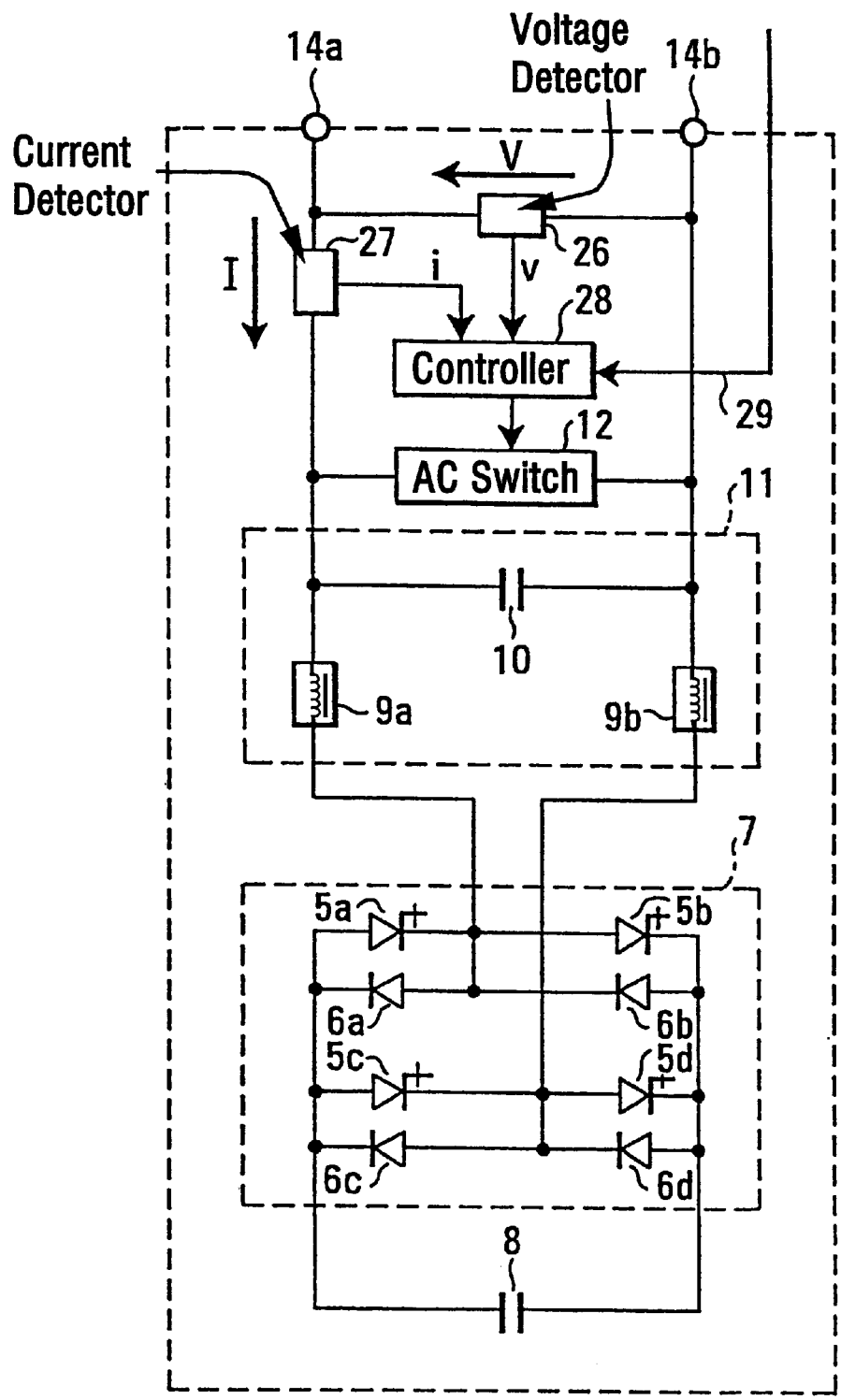
FIG. 3 shows a compensation device according to a second embodiment of the invention.

FIG. 3 illustrates the compensator unit 13 including a pre-charging means which supplies a pre-charging power (current and voltage ) from the transmission lines 2a, 2b in order to pre-charge the DC capacitor 8. The pre-charging means comprises a voltage detector 26 to detect an impressed voltage V of the AC switch 12, a current detector 27 to detect a zero-cross of the line current I and an AC switch controller 28 receiving the two output signals i, v from the voltage detector 26 and from the current detector 27 and a pre-charge command from a main controller (not shown) transmitted over the signal transmission line and controlling the AC switch 12 in response to these signals.

The AC switch controller 28 can control the AC switch 12 into its off (open) or on (close) state at predetermined turn-on and/or turn-off timings and an AC current can flow through the AC switch 12 when it is controlled into its on-state. When the AC switch 12 is controlled in its on-state, an output i of the current detector 27 not only indicates the line current but also a current of the AC switch 12. Preferably, the current detector 27 only detects the current of the AC switch 12 and it can be installed at any suitable position, as long as it can detect the current of the AC switch 12.

Next, an operation of the circuit shown in FIG. 3 is explained in detail. Basically, an input voltage of the single-phase inverter 7 is mostly equal to the impressed voltage V of the AC switch 12 since the voltage over the AC switch 12 is also applied to the single-phase inverter (through the filter reactors 9a, 9b). When all the self arc-suppressing semiconductors 5a to Ed are kept in an off-state, the single-phase inverter 7 can be operated as a single-phase diode rectifier because of the provision of the free-wheeling diodes 6a to 6d. Therefore, a AC voltage V present across the AC switch 12 can be used for the pre-charging operation of the DC capacitor 8 since the voltage V will be transferred, rectified and supplied as a pre-charging DC voltage to the DC capacitor 8.

The pre-charging operation is carried out by the AC switch controller 28 as shown in FIG. 4. Firstly, the circuit breaker 4 is closed after a turn-on command is given to the AC switch 12. Immediately after the closing of the AC switch 12, a line current starts to flow through the transmission lines 2a, 2b and the AC switch. Although the line current contains an overcurrent for a while, the overcurrent is dumped by internal resistors inside of the transmission lines 2a, 2b and on. After the AC switch controller 28 receives a pre-charging command via the signal transmission line 29, the AC switch controller 28 gives a switching signal, as shown in the top graph in FIG. 4, to the AC switch 12. Here, the control performed by the switch-on/switch-off state of the switching signal includes a delay time "alfa", defined as a phase control angle, from each zero-crossing of the line current I.

Within the delay time alfa the AC switch 12 is open and therefore the line current I can charge the filter capacitor 10 such that a voltage V generated across the AC switch 12 during this phase control angle. Since this voltage V is also the input voltage of the single-phase inverter 7 (which now operates as a single-phase diode rectifier as explained above), the DC capacitor 8 is charged by this input voltage V.

As shown with the bottom graph in FIG. 4, due to the phase control angle alfa, the impressed peak voltage Vth of the AC switch 12 can be controlled. Therefore, the amplitude of the pre-charging voltage of the DC capacitor 8 and the time constant of a pre-charging operation period can be controlled by the phase control angle alfa. Allowing a predetermined maximum voltage Vth to be applied to the DC capacitor (e.g. as limited by the break-through voltage of the DC capacitor) the phase control angle alfa (i.e. the delay time after the zero-crossing of the line current) is a time interval from the time, when the line current crosses the zero, to the another time when the AC switch 12 voltage reaches the predetermined voltage Vth while the voltage in this time interval is used as the pre-charging voltage of the DC Capacitor 8.

After the pre-charging operation is completed, the AC switch controller 28 of the compensator device 3 can carry out the start-up operation as disclosed in EP 98 106 780.4. Preferably, the AC switch 12 is turned off at the zero-crossing of the line current such that the line current is then commutated from the AC switch 12 to the single-phase inverter 7.

The switching signal as shown in the top graph in FIG. 4 generates an AC voltage as an input voltage V to the single-phase inverter 7. The AC switch controller 28 can output one pair of switching signals every other period of the line current. Then, the input voltage V to the single phase inverter becomes a DC voltage.

As explained above, in the second embodiment the line current front the power transmission lines after closing the circuit breaker 4 can be used for charging the DC capacitor 8, since the( AC switch controller 28 opens the AC switch 12 (or the Ac switch automatically opens as explained hereinafter with reference to FIG. 5) when the current detector 27 detects a zero-crossing of the line current and closes the AC switch 12 again when the voltage detector 26 detects a predetermined voltage Vth across the AC switch 12.

As also explained above, the value "alfa" can be a fixed "constant" predetermined value or it may is a changeable and controllable value depending from the voltage of the DC capacitor (8).

Third Embodiment

Figure 5:
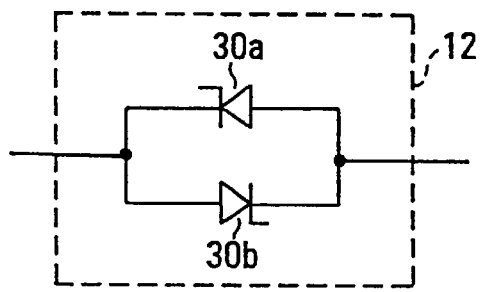
FIG. 5 shows an embodiment of an AC switch 12 that consists of two anti-parallel connected thyristors according to the invention.

FIG. 5 shows a preferred embodiment of an AC switch 12 applicable to the compensator unit 13 in FIG. 3. The AC switch 12 consists of two thyristors 30a, 30b connected in anti-parallel. Generally, a single thyristor has a defined turn-on-time dependent on the applied voltage, however, it has no defined turn-off-time. However, if the turn-on signal of the thyristor is removed when the thyristor conducts a current, the thyristor is automatically turned off when the conducting current is equal to zero. Therefore, the AC switch controller 28 preferably removes the turn-on signal during the on-state as shown in FIG. 4 and the AC switch 12 in FIG. 5 turns off automatically at the zero crossing of the line current I dues to the turn-off characteristic of the thyristor 30a, 30b. Then, the voltage across the AC switch 12 starts to be generated as shown in FIG. 4. Therefore, in case the compensator device 3 is equipped with the AC switch 12 shown in FIG. 5, the current detector 27 is not necessary.

In addition, it is preferred that the thyristors 30a, 30b of the AC switch 12 are not electrically triggered thyristors but light triggered thyristors. The reason is, that the compensator device TL-RSC 3 should be floated from the earth potential during normal operation and the gate circuits of the thyristors 30a, 30b should also be insulated from the earth potential. When applying thyristors as the AC switch 12 to the compensator device 3, the insulation level of the thyristors may be very high. On one hand, if the electrically triggered thyristors are used, huge insulating transformers are necessary to insulate the gate circuits from the earth potential. Therefore, if light triggered thyristors are applied, the insulating transformers can be eliminated, because the light triggered thyristors are turned on directly by a LASER.

Fourth Embodiment

It should be noted that in FIG. 4 the AC switch 12 is first turned on at a time when the impressed voltage V of the AC switch 12 is not zero, namely when the filter capacitor 10 keeps a certain voltage. At the turn-on operation of the AC switch 12, a discharge current which is comparatively large flows from the filter capacitor 10 to the AC switch 12. However, the discharge current appears only during the pre-charging operation. Therefore, the phase control angle alfa should preferably be set to the value as close to zero, 180 degrees, or 360 degrees as possible.

However, it is also necessary to protect the AC switch 12 from the discharging current flown from the filter capacitor 10. An example of such a protection is to insert a current limiting device (preferably a resistor with nonlinear resistance characteristic) into a circuit through which the discharging current flows. Such a protection device has been already described in "Integrated Power Module In IGBT Technology For Modular Power Traction Converters", Proceedings of the European Power Electronics and Drives Association (EPE) '97, Vol. 1, pp. 106–111, and it is called a Special Short Current Limiter (SCCL). Therefore, according to another embodiment of the invention, a SCCL can be connected directly with the filter capacitor 10.

Figure 6:
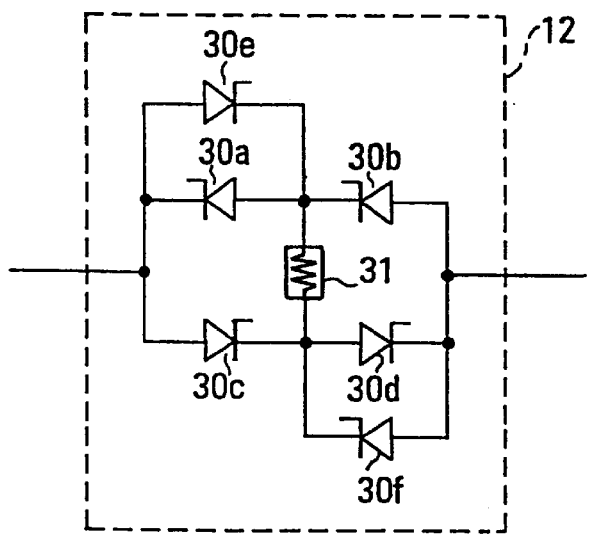
FIG. 6(1) shows another embodiment of an AC switch 12 that consists of four thyristors and a current limiting device according to the invention.
Figure 6:
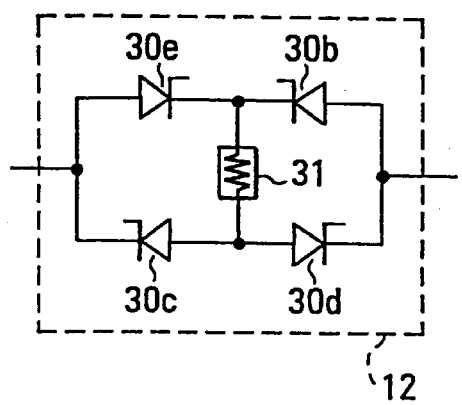
Figure 6:
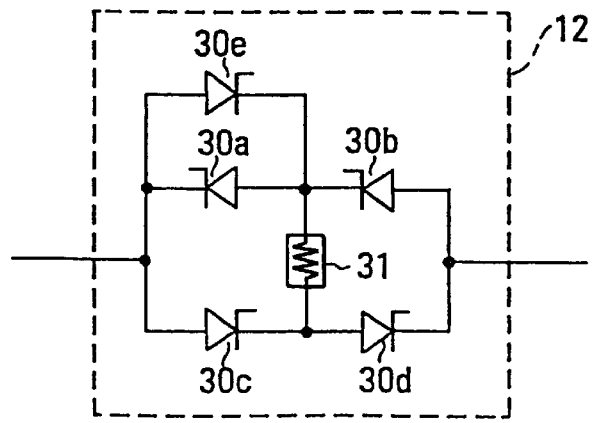

Another protection technique for protecting the AC switch 12 according to a fourth embodiment of the invention is shown in FIG. 6(1). The AC switch 12 integrates a current limiting device 31, for example a resistor and/or a reactor, inside the AC switch 12 itself. More specifically, the configuration of an AC switch 12 shown in FIG. 6(1) uses two thyristors 30e, 30b connected in a series configuration at their cathodes and two thyristors 30c, 30d connected in a series configuration at their anodes while the current limiter 31 is provided therebetween.

On the other hand, another protection technique for protecting the AC switch 12 according to a fourth embodiment of the invention is shown in FIG. 6(2). This AC switch 12 includes 6 thyristors. The AC switch 12 in FIG. 6(2) has two operation modes in this case. During the precharging operation of the invention, four thyristors 30a, 30d, 30e, 30f are selected such that the AC switch 12 can assume an open and a close state during the switching while two thyristors Bob, 30c are kept in an off-state (open) by the AC switch controller. More specifically, during the pre-charging operation, one pair of thyristors 30a and 30f and another pair of thyristors 30d and 30e are controlled to respectively assume the same switching state, on and off, respectively.

During the normal operation following the pre-charging operation, on the other hand, four thyristors 30a, Bob, 30c, 30d are selected for the switching and two thyristors 30e, 30f are kept in an off-state. Then, one pair of the thyristors 30a and 30b and another pair of the thyristors 30c and 30d are controlled at the same time and are set to the same switching state, on and off, respectively Therefore, only during the pre-charging operation, the current limiting device 31 conducts the line current and on the other hand, there occurs no dead power loss inside the current limiting device 31 during the normal operation when the AC switch is closed because different thyristors are selected in the two different operation modes.

As explained with reference to FIG. 6(2), the two thyristors 30e and 30f are necessary to realize the switching signal pattern as shown in FIG. 4 having two switching at 0° and 180°. However, if per 360° interval only one switching is to be carried out, one of the pair of switching signals per every period of the line current is sufficient to be given to the AC switch 12 as mentioned above. In this case, only one thyristor 30e can be used as shown in FIG. 6(3). Then, during the pre-charging operation, especially while one half of a period of the line current, two thyristors Bed, 30e are selected. In addition, while another half a period, two thyristors 30a, 30b are selected. The control is essentially the same as in FIG. 6(2), only that only one switching is carried out per one full cycle due to the provision of the thyristor 30e.

FIG. 6(4) shows waveforms before and after the rectifier (as explained above, the single-phase inverter 7 can be operated as a single-phase diode rectifier because of the provision of the free-wheeling diodes 6a to 6d) for the above described AC switch embodiments in FIG. 6(1), 6(2), 6(3). In each configuration the DC capacitor 8 is charged with 2 voltages pulses per 360° (FIG. 6(1), 6(2)) or with 1 voltage pulse per 360° (FIG. 6(3)).

Fifth Embodiment

During the normal operation (i.e. the PWM control), the compensator device TL-RSC 3 is a condition of being completely floated from the earth potential. Therefore, the self arc-suppressing semiconductors 5a to 5d of the single-phase inverter 7 inside the compensator unit 13 is in the same condition. Normally, each self arc-suppressing semiconductor 5 has a gate drive unit and a gate power necessary for the gate drive unit is supplied from a high frequency voltage supply circuit which is set to near the earth potential. As explained before, the gate drive unit and the high frequency voltage supply circuit supplying the gate power to the gate drive unit are necessary in order to carry out the PWM control of the single-phase inverter 7.

Figure 7:
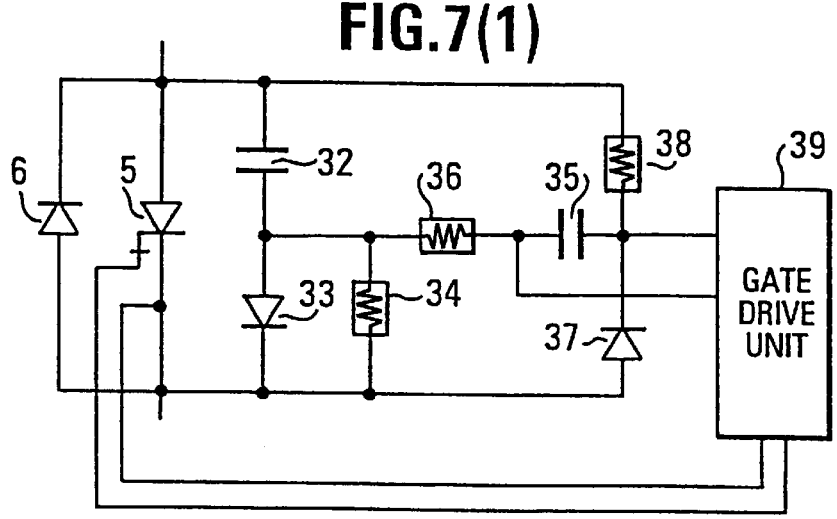
FIG. 7(1) shows an embodiment of a gate drive power supply circuit.

Due to the high frequency voltage supply circuit being set to near the earth potential, an insulating transformer is required in order to supply the gate power from the voltage supply circuit to the gate drive unit as is shown schematically in FIG. 7(2). In the case of the compensator device TL-RSC 3, the insulating transformer must have an extremely high insulating voltage level (due to the large voltages and currents present on the power transmission lines) and hence it has a very large size.

In order to solve such a problem, a gate drive power supply circuit according to the invention, which can supply the gate power from a main circuit set to the floating potential, is constituted as shown in FIG. 7(1). Such a gate drive power supply circuit is described in "Novel Gate Power Supply Circuit Using Snubber Capacitor Energy For Series-Connected GTO Valves", EPE'97, Vol. 1, pp. 576–581.

In FIG. 7(1), a self arc-suppressing semiconductor 5 and a free wheeling diode 6 are connected anti-parallel. A series connection of a snubber capacitor 32 and a snubber diode 33 is connected in parallel to the self arc-suppressing semiconductor 5 wherein the snubber diode 33 conducts current in the same direction as the self arc-suppressing semiconductor. 5 does. A snubber resistor 34 is connected in parallel to the snubber diode 33. Also connected in parallel to the free-wheeling diode 6 is a series connection of a pre-charging resistor 38 and a supply diode 37, wherein the supply diode 37 is connected in the same conducting direction as the free-wheeling diode 6. The anode of the supply diode 37 is connected to the cathode of the self arc-suppressing semiconductor 5 and a cathode of the snubber diode 33 is connected to the anode of the free wheeling diode 6. A series connection of a supply resistor 36 and a supply capacitor 35 is connected to the junction node of the series connection of the snubber capacitor 32 and the snubber diode 33 and the junction node of the series connection of the pre-charging resistor 38 and the supply diode 37. A gate drive unit 39 is connected with the self arc-suppressing semiconductor 5 and with the two terminals of the supply capacitor 35.

A more concrete example of the gate drive unit 39 is shown in FIG. 7(3). The gate drive unit 39 comprises an ON gate drive circuit part and an OFF gate drive circuit part, respectively formed by a DC—DC converter DC1, DC2 and capacitors C1, C2, C3. Two switches formed by transistors T1, T2 supply the ON/OFF trigger signal to the self arcsuppressing semiconductor 5 during the PWM operation of the inverter. The two gate drive circuits follow ON/OFF switching commands generated by a PAM control. The two gate drive circuits need power to generate the gate current for the turn ON/OFF operation. In FIG. 7(1) and 7(3), this power is provided by the supply capacitor 35. By contrast, in the prior art in FIG. 7(2), this power is supplied by the high frequency voltage source HFVS. To prevent an overloading of the supply capacitor 35 and to keep the voltage over the supply capacitor 35 constant, therefore, an over-voltage protection circuit is necessary.

Thus, in FIG. 7(1) an energy trapped in the snubber capacitor 32 is transferred to the supply capacitor 35 at the turn-on operation of the self arc-suppressing semiconductor 5 and the gate power consumed in a gate drive unit 39 can be obtained from the supply capacitor 35.

Before the first switching operation (during the normal operation) of the self arc-suppressing semiconductor 5, however, it is necessary to obtain the gate power through a pre-charging resistor 38 not only to maintain the steady off-state of the self arc-suppressing semiconductor 5, that is to obtain a gasp-off bias voltage, but also to carry out the first switching operation. The gate-off bias voltage is essential to decrease a leakage current of the self arc-suppressing semiconductor 5. Therefore, in case the TL-RSC 3 is equipped with such a gate drive power supply circuit as shown in FIG. 7(1), the DC capacitor 8 must keep comparatively high voltage before the single-phase inverter 7 starts up.

The above-mentioned pre-charging technique in FIG. 3, FIG. 4 for the DC capacitor 8 by using the AC switch 12 allows to employ the gate drive power supply circuit in FIG. 7(1) in the TL-RSC 3, because the pre-charging technique can pre-charge to not only the DC capacitor 8 but also the supply capacitor 35 at the same time. Therefore, the TL-RSC 3 need not employ a high frequency voltage supply circuit including the insulating transformer with an extremely high insulating voltage level as described before. Since the circuit in FIG. 7(1) is essentially connected in parallel to the respective self arc-suppressing semiconductor 5, the pre-charging technique charges not only the DC capacitor 8 but also the supply capacitor and thus the circuit in FIG. 7(1) not requiring the insulating transformer can be employed as a gate drive power supply circuit. By doing so, all the power necessary to charge both the DC capacitor 8 and the supply capacitor 35 can be derived from the AC power system 1a, 1b itself via the transmission lines 2a, 2b.

Figure 8:
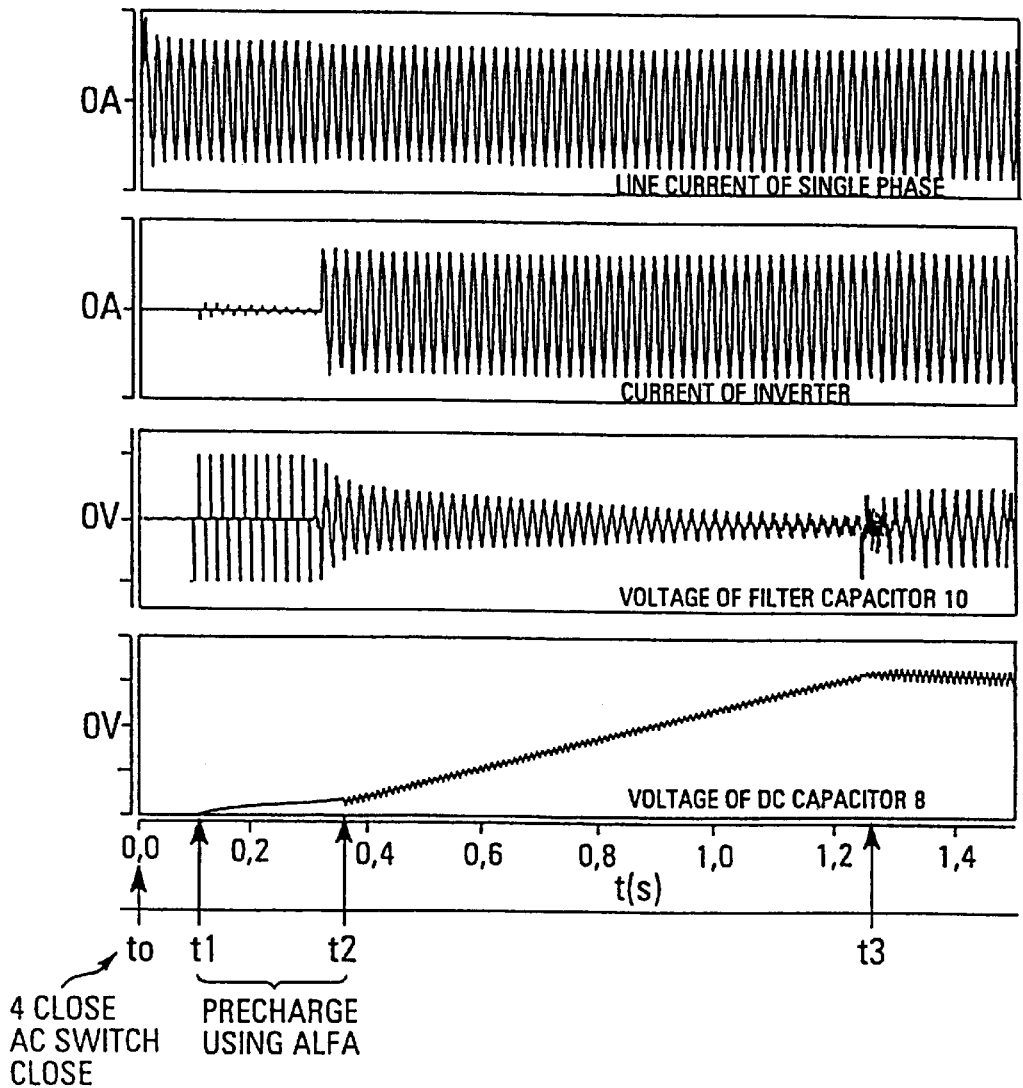
FIG. 8 shows a pre-charging operation of the DC capacitor.
Figure 7:
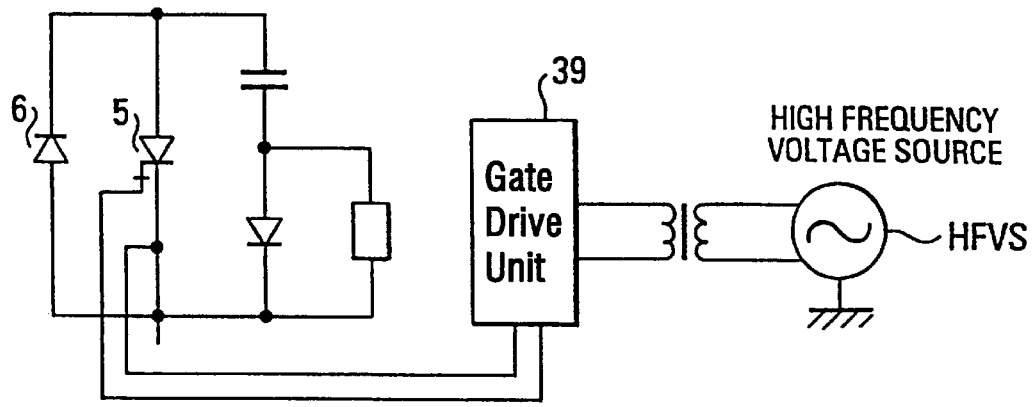
Figure 7:
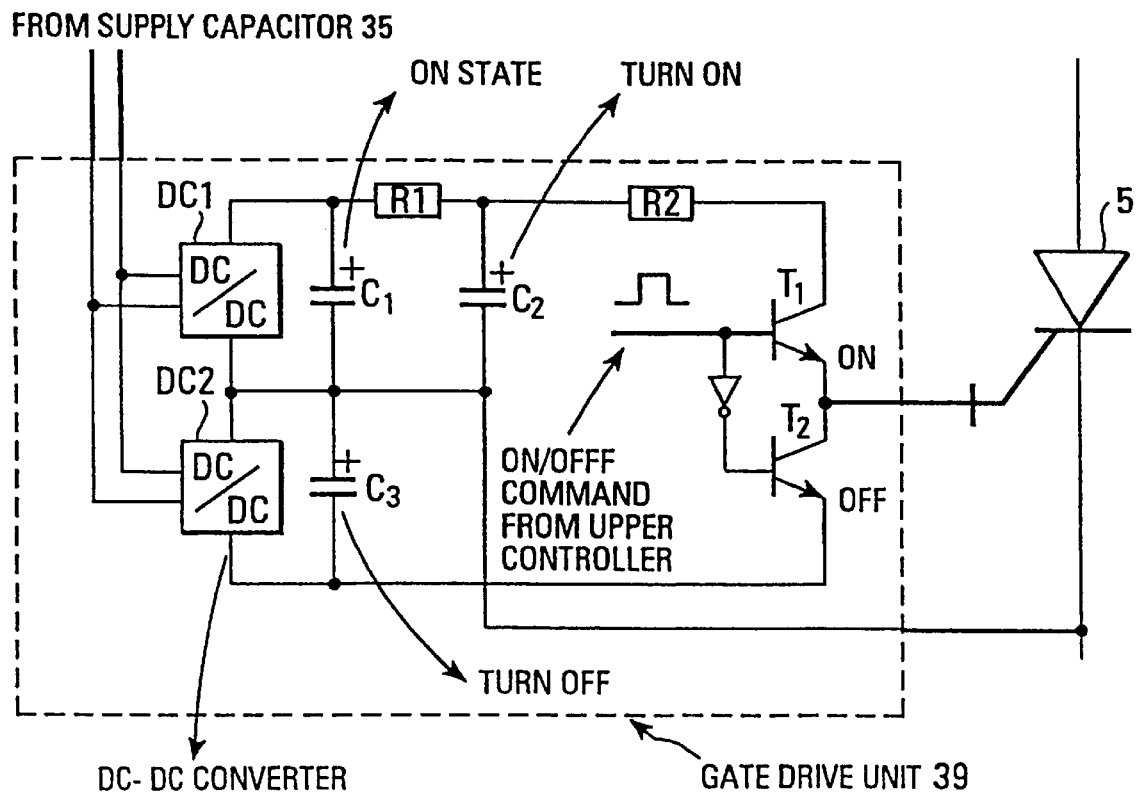

FIG. 8 shows the pre-charging operation using the AC switch 12 when the TL-RSC 3 of FIG. 3 is equipped with the gate drive power supply circuit shown in FIG. 7(1) (it is to be noted that each self arc-suppressing semiconductor 5a–5d is equipped with a circuit as in FIG. 7(1)).

From top to bottom in FIG. 8, the first waveform is the line current waveform, the second one is the single-phase inverter 7 Current waveform, the third waveform is the AC switch 12 voltage waveform and the fourth waveform is the DC capacitor 8 voltage waveform.

At t=0, especially while the AC switch 12 keeps on-state, the circuit breaker 4 is closed. During the time from t=0 to t=t1, the AC switch 12 conducts the line current which starts to flow through the transmission lines 2a, 2b and then the AC switch 12 stays closed.

Next, curing the time from t=t1 to t=t2, the AC switch 12 is operated by the phase control angle alfa as shown in FIG. 4 to pre-charge the DC capacitor 8. In t1<t<t2 the charging voltage of the DC capacitor 8 gradually increases from 0 to a predetermined rate (which is here set to 10 depending on the length of alfa) of the rated voltage.

From t2 onwards, the peak impressed voltage of the AC switch 12 is clamped to a constant value. Therefore, from t=t2 to t=t3 after reaching 10% of the rated voltage, the self arc-suppressing semiconductors 5a to Ed which form the single-phase inverter 7 can execute normal switching operations (i.e. the PWM control) by using the gate drive unit 39 of the gate drive power supply circuit as shown in FIG. 7(1).

Then, the voltage of the DC capacitor 8 increases to the rated voltage according to a DC voltage controller (not shown here) raising from 10% to 100%.

After t=t3, when the rated voltage of the DC capacitor 8 is already reached, the TL-RSC 3 can carry out the normal switching operations with the DC capacitor already charged to its normal Operation voltage. The voltage of the DC capacitor 8 can be adjusted by controlling a phase difference between the line current and an output voltage of the single-phase inverter 7 in proportion to an error between measured, voltage of the DC capacitor 8 and a command voltage of the DC voltage controller.

Sixth Embodiment

The pre-charging means PCM(1) in FIG. 1(1) comprises according to the embodiment in FIG. 1(2) one pre-charging circuit 20 and FIG. 2 shows an embodiment of a pre-charging circuit 20 which is low cost. However, the diode rectifier 24 can be replaced by a thyristor converter or another power converter. If the single-phase inverter 7 is a three-level single-phase inverter, the pre-charging circuit 20 outputs three-level DC voltages.

FIG. 5 and FIG. 6(1)–6(3) illustrate only the basic embodiments of the AC switch 12 of the invention. In real applications;, additional protection circuits may preferably be used. Some conventional protection circuits are useful. For example, anode reactors to limit di/dt when the AC switch 12 is turned on, and snubber circuits to limit dv/dt when the AC switch 12 is turned off may be used. In proportion to the voltage of the DC capacitor 8, it is conceivable that the thyristor 30 consists of some thyristors connected in series, namely thyristor valves.

FIG. 7(1) shows an example of the gate drive power supply circuit which can be effectively used in the compensator device 3 of FIG. 3. However, another gate drive power circuit can be applied to the TL-RSC 3, if it is possible to get the gate power from the DC capacitor 8 directly or indirectly.

In addition, e.g. in FIG. 1(1), 1(2) and FIG. 9, only one circuit breaker 4 is connected between the transmission line 2b and the AC power system 1b. However, it is possible to install several (possibly series connected) circuit breakers 4 in the power transmission system.

Industrial Applicability

As understood according to the embodiments, according to the invention, it is possible to decrease the pre-charging resistor because the pre-charging circuit can pre-charge plural DC capacitors at the same time. Consequently, the realization Df the TL-RSC is cheaper.

According to the invention, it is possible to eliminate additional pre-charging circuit because the DC capacitor can be charged by the AC switch control. Consequently, it is realized that the TL-RSC is more compact and cheaper.

According to the invention, it is possible to eliminate the current detector to detect the line current because the AC switch cain consist of the thyristors connected in anti-parallel. Consequently, it is realized that the TL-RSC is cheaper.

In addition, it is possible to eliminate the insulating transformers of the thyristors because the thyristors are light triggered thyristors. Consequently, it is realized that the TL-RSC is more compact.

According to the invention, it is possible to apply the gate drive power supply circuit to the TL-RSC because the pre-charging technique for the DC capacitor by using the AC switch can pre-charge the supply capacitor of the gate drive power supply circuit and the DC capacitor of the compensator unit at the same time. Consequently, it is realized that the TL-RSC is more functional.

Additionally according to the invention, it is possible to decrease or eliminate a comparative amount of the components of the TL-RSC. Consequently, it is realized that the TL-RSC is more compact and more reliable.

Finally, in case that such a TL-RSC is introduced to power transmission systems, it is realized by much less costs that the power transmission systems are more reliable.

The invention is not limited to the above-described embodiments, which are currently preceived as the best mode of the invention and which only serve the general explanation of the principle of the invention. Within the scope of the invention, as defined in the dependent claims, the compensator device according to the invention can also be realized with other embodiments which have not been described above. In particular, the compensation device can comprise features, which result from a combination of the respective single features of the claims.

Reference numerals in the description and in the drawings only serve illustration purposes to facilitate the understanding of the invention and do not limit the scope of the protection.

What is claimed is:

1. A compensation device connected in series with power transmission line having at least one circuit breaker, including:

at least one compensator unit with a transformerless reactive series compensator having a DC capacitor and a single-phase inverter; and pre-charging means for pre-charging said DC capacitor of said at least one compensator unit.

2. The device according to claim 1, wherein said single-phase inverter comprises self arc-suppressing semiconductors.

3. The device according to claim 2, wherein each of said self arc-suppressing semiconductors has a gate power supply means to supply a gate power from said DC capacitor directly or indirectly to a gate drive unit of each self arc-suppressing semiconductor.

4. The device according to claim 1, wherein said pre-charging means comprises one pre-charging circuit providing a DC charging voltage to charge said DC capacitor, first switches to disconnect and connect said pre-charging circuit and said DC capacitor, second switches to disconnect and connect said single-phase inverter and said power transmission lines, and a pre-charging controller for controlling said switches such that, during the pre-charging operation, said pre-charging circuit is connected to said DC capacitor, while said DC capacitor is disconnected from output terminals of said compensator unit, and, after the pre-charging, said first and second switches are controlled such that said DC capacitor is disconnected from said pre-charging circuit but connected to the output terminals of said compensator unit.

5. The device according to claim 4, wherein several compensator units, each including a DC capacitor, are provided, wherein respective switches are provided for connecting and disconnecting control separately for each DC capacitor, and wherein said pre-charging circuit simultaneously pre-charges all DC capacitors connected in parallel.

6. The device according to claim 4, wherein said pre-charging circuit comprises a converter.

7. The device according to claim 1, wherein said pre-charging means comprises an AC switch having first and second terminals coupled to output terminals of said at least one compensator unit and an AC switch controller opening said AC switch for a time interval after a zero-crossing of a line current flowing through said power transmission lines.

8. The device according to claim 7, wherein said AC switch includes at least two thyristors connected in anti-parallel.

9. The device according to claim 7, wherein said AC switch includes four thyristors having respective cathodes and anodes and one current limiting device, wherein the cathodes of first and second thyristors are connected together at a first series connection node, the anodes of third and fourth thyristors are connected together at a second series connection node, the anode of said first thyristor and the cathode of said third thyristor are connected to said first terminal of said AC switch, the anode of said second thyristor and the cathode of said fourth thyristor are connected to said second terminal of said AC switch, and said current limiting device is connected between said first and second series connection nodes.

10. The device according to claim 7, wherein said AC switch includes five thyristors having respective cathodes and anodes, and one current limiting device, wherein the cathode of a third thyristor is connected to the anode of a fourth thyristor, the cathode of a second thyristor is connected to the anode of a first thyristor, the cathode of the first thyristor and the anode of said third thyristor are connected to said first terminal of said AC switch, the anode of a second thyristor and the cathode of said fourth thyristor are connected to said second terminal of said AC switch, a fifth thyristor is connected in anti-parallel with said first thyristor, and the one current limiting device is connected between said anode of said first thyristor and the cathode of said third thyristor.

11. The device according to claim 10, wherein said AC switch includes six thyristors, wherein a sixth thyristor is connected in anti-parallel to said fourth thyristor.

12. The device according to claim 1, wherein said pre-charging means decouples said DC capacitor from the power transmission lines during the pre-charging operation.

13. The power transmission system comprising:
two AC power systems coupled to each other through power transmission lines;
at least one circuit breaker inserted in the power transmission lines; and
at least one compensation device inserted in said power transmission lines
wherein said compensation device includes:
at least one compensator unit with a transformerless reactive series compensator having a DC capacitor and a single-phase inverter; and
pre-charging means for pre-charging said DC capacitor of said at least one compensator unit.

14. The system according to claim 13, wherein said single-phase inverter comprises self arc-suppressing semiconductors.

15. The system according to claim 13, wherein said pre-charging means decouples said DC capacitor from the power transmission lines during the pre-charging.

16. The system according to claim 13, wherein said pre-charging means comprises one pre-charging circuit providing a DC charging voltage to charge said DC capacitor, first switches to disconnect and connect said pre-charging circuit and said DC capacitor, second switches to disconnect and connect said single-phase inverter and said power transmission lines, and a pre-charging controller for controlling said switches such that, during pre-charging, said pre-charging circuit is connected to said DC capacitor, while said DC capacitor is disconnected from output terminals of said compensator unit, and, after the pre-charging, said switches are controlled such that said DC capacitor is disconnected from the pre-charging circuit but connected to the output terminals of said compensator unit.

17. The system according to claim 16, wherein several compensator units, each including a DC capacitor, are provided, wherein respective switches are provided for connecting and disconnecting control separately for each DC capacitor, and wherein said pre-charging circuit simultaneously pre-charges all DC capacitors connected in parallel.

18. The system according to claim 16, wherein said pre-charging circuit comprises a converter.

19. The system according to claim 18, wherein said AC switch includes at least two thyristors connected in anti-parallel.

20. The system according to claim 13, wherein said pre-charging means comprises an AC switch having first and second terminals coupled to output terminals of said at least one compensator unit and an AC switch controller opening said AC switch for a time interval after a zero-crossing of a line current flowing through said power transmission lines.

\* \* \* \* \*